(12) United States Patent
Anderson et al.

(10) Patent No.: US 8,996,171 B2
(45) Date of Patent: Mar. 31, 2015

(54) PHEROMONE FOR ROBOTIC BOUNDARY

(75) Inventors: Noel Wayne Anderson, Fargo, ND (US); Heidi Paulino, Charlotte, NC (US); Monte Dickson, Charlotte, NC (US)

(73) Assignee: Deere & Company, Moline, IL (US)

( * ) Notice: Subject to any disclaimer, the term of this patent is extended or adjusted under 35 U.S.C. 154(b) by 1257 days.

(21) Appl. No.: 12/698,214

(22) Filed: Feb. 2, 2010

(65) Prior Publication Data

US 2011/0190931 A1 Aug. 4, 2011

(51) Int. Cl.
*G05B 19/18* (2006.01)
*G05D 1/02* (2006.01)

(52) U.S. Cl.
CPC ............ *G05D 1/0276* (2013.01); *G05D 1/0225* (2013.01)
USPC ............ 700/253; 700/245; 700/247; 700/258

(58) Field of Classification Search
CPC ...................... G05D 2201/0207; G05D 1/0276
USPC ................. 700/245, 247, 248, 253, 258, 260; 318/580, 568.12, 568.16, 568.17; 180/167, 168, 169
See application file for complete search history.

(56) References Cited

U.S. PATENT DOCUMENTS

| | | | |
|---|---|---|---|
| 5,572,856 A * | 11/1996 | Ku ............................... | 56/10.2 A |
| 6,255,793 B1 * | 7/2001 | Peless et al. ................... | 318/580 |
| 6,365,189 B1 | 4/2002 | Quong | |
| 7,354,611 B1 * | 4/2008 | Ferkovich et al. ................ | 426/1 |
| 7,567,052 B2 * | 7/2009 | Jones et al. ..................... | 318/587 |
| 7,709,623 B2 * | 5/2010 | Bintrim et al. ................ | 536/23.7 |
| 7,877,166 B2 * | 1/2011 | Harwig et al. ................. | 700/253 |
| 2003/0172730 A1 * | 9/2003 | Reed ................................ | 73/195 |
| 2003/0236590 A1 * | 12/2003 | Park et al. ...................... | 700/245 |
| 2004/0210344 A1 * | 10/2004 | Hara et al. ...................... | 700/245 |
| 2006/0038521 A1 * | 2/2006 | Jones et al. ..................... | 318/567 |
| 2006/0086039 A1 * | 4/2006 | Israely et al. ................. | 43/132.1 |
| 2006/0136097 A1 * | 6/2006 | Kim et al. ....................... | 700/258 |
| 2007/0037705 A1 * | 2/2007 | Wei ................................ | 504/100 |
| 2007/0061041 A1 * | 3/2007 | Zweig ........................... | 700/245 |
| 2007/0265004 A1 * | 11/2007 | Yamada et al. ............. | 455/435.1 |
| 2008/0010023 A1 * | 1/2008 | Vergassola et al. ............. | 702/19 |
| 2008/0039974 A1 * | 2/2008 | Sandin et al. ................. | 700/258 |
| 2008/0051953 A1 * | 2/2008 | Jones et al. ..................... | 701/28 |

(Continued)

FOREIGN PATENT DOCUMENTS

EP 0736630 A1 10/1996

OTHER PUBLICATIONS

Susnea I. et al. , "RFID Digital Pheromones for Generating Stigmergic Behavior to Autonomous Mobile Robots" In 4th WSEAS/IASME International Conference on Dynamic Systems and Control, Corfu, Greece, Oct. 26-28, 2008.*

(Continued)

Primary Examiner — Khoi Tran
Assistant Examiner — Jorge Peche
(74) Attorney, Agent, or Firm — Yee & Associates, P.C.

(57) ABSTRACT

A method for regenerating a boundary of an area for containing a mobile machine is provided. An emitter is detected in an area designated to contain the mobile machine. In response to detecting the emitter, a function is performed. In addition, the emitter is reapplied on a predetermined time interval basis over an existing detected emitter to minimize deterioration of a strength of the emitter due to time and environmental factors.

24 Claims, 5 Drawing Sheets

(56) References Cited

U.S. PATENT DOCUMENTS

| | | | |
|---|---|---|---|
| 2008/0109126 A1* | 5/2008 | Sandin et al. | 701/23 |
| 2009/0254218 A1* | 10/2009 | Sandin et al. | 700/258 |
| 2009/0271125 A1* | 10/2009 | Vergassola et al. | 702/22 |
| 2009/0281661 A1* | 11/2009 | Dooley et al. | 700/258 |
| 2011/0165115 A1* | 7/2011 | Zhang et al. | 424/84 |

OTHER PUBLICATIONS

Svennebring et al., "Building Terrain-Covering Ant Robot: A Feasibility Study" Autonomous Robot, May 1, 2004.*

Susnea et al. ("RFID Digital Pheromones for Generating Stigmergic Behavior to Autonomous Mobile Robots" in 4th WSEAS/IASME International Conference on Dynamic System and Control, Corfu, Greece, Oct. 26-28, 2008).*

Svennebring et al. ("Building Terrain-Covering Ant Robot: A Feasibility Study" Autonomous Robot, May 1, 2004).*

Wagner et al. (Distributed covering by ant-robots using evaporating traces; IEEE Transaction on Robotic and Automation. vol. 15, Issue 5: pp. 918-933; Oct. 1999).*

Russell et al, (Sensing odour trails for mobile robot navigation; IEEE international conference, Robotic and Automation. vol. 3, pp. 2672-2677; May 1994).*

Susnea et al., "Real-Time, Embedded Fuzzy Control of the Pioneer3-DX Robot for Path Following," In: 12WSEAS International Conference on Systems, Heraklion, Greece, Jul. 22-24, 2008, pp. 334-338.

European Search Report, dated Mar. 16, 2012, regarding Application No. 11 152 044.1-2206, 13 pages.

European Search Report, May 18, 2011, 8 pages.

Susean I, et al, "RFID Digital Pheromones For Generation Stigmeric Behavior to Autonomous Mobile Robots", Oct. 26, 2008.

Jonas, Svennebring and Sven Koenig, "Building Terrain-Coverning Ant Robots: A Feasibility Study", May 1, 2004.

Marco Mamei, et al., "Pervasive Pheromone-Based Interaction With RFID Tags", Jun. 1, 2007.

"Military R-Gator", John Deere Federal & Military Sales,1 page, retrieved Oct. 16, 2009 www.deere.com/en_US/contractsales/fedmilitarysales/cce/r_gator/r_gator.html.

"Robomow Robotic Mower", YouTube—Robomow Robotic Mower, 1 page, retrieved Oct. 16, 2009 www.youtube.com/watch?v=al7OuvxAIRs.

"iRobot Roomba 560 official video demo", YouTube, 1 page, retrieved Oct. 16, 2009 www.youtube.com/watch?v=CLIPLiQDIk0.

"Unloading on the go with AutoTrac", You Tube, 1 page, retrieved Oct. 16, 2009 www.youtube.com/watch?v=et4clJ4vtdw.

Mehmood et al., "Navigation and Interaction in Physical Spaces using RFID Enabled Spatial Sensing", SenSys'07, Nov. 6-9, Sydney, Australia, 2007, pp. 1-2.

"RFID 'Powder'—World's Smallest RFID Tag", Technovelgy.com, pp. 1-4, retrieved Oct. 16, 2009 www.technovelgy.com/ct/Science-Fiction-News.asp?NewsNum=939.

"Smart RFID Carpet", Mar. 14, 2006, pp. 1-2, retrieved Oct. 16, 2009 www.i4u.com/article5258.html.

"RFID Carpets", pp. 1-8, retrieved Oct. 16, 2009 www.psfk.com/2008/03/rfid-carpets.html.

"Defying the Laws of Fulfillment", The KIVA Mobile Fulfillment System, KIVCA Systems, 2007 pp. 1-8 www.kivasystems.com.

* cited by examiner

FIG. 6

PHEROMONE FOR ROBOTIC BOUNDARY

FIELD OF THE INVENTION

The present invention relates generally to a mobile service robot and more particularly to a method and system for designating and maintaining a boundary for a mobile service robot.

BACKGROUND OF THE INVENTION

Today, lawn mowing is considered by many to be one of the most boring and tiring routine household tasks. As a result, several mobile robotic devices have been invented for automatically mowing lawns to save people time and effort. Navigation, obstacle avoidance, and motion control are some of the key functional components needed for safe, reliable, and accurate operation of these mobile robotic mowing units. These mobile robots are fully automatic, battery-powered units that automatically stay within a designated boundary while performing the task of mowing. Typically, an electrical wire designates the robotic boundary for task performance.

SUMMARY

An embodiment of the present invention provides a method for regenerating a boundary of an area for containing a mobile machine. An emitter is detected in an area designated to contain the mobile machine. In response to detecting the emitter, a function is performed. In addition, the emitter is reapplied on a predetermined time interval basis over an existing detected emitter to minimize deterioration of a strength of the emitter due to time and environmental factors.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Illustrative embodiments of the present invention provide systems and methods for maintaining boundaries in and around an operating environment for a mobile service robot. Field robots are a superset of mobile teleoperated, supervised, and fully autonomous robots of all sizes. Service robots are smaller field robots, such as robotic lawn mowers. These field robotic or autonomous systems, sometimes referred to as mobile robotic platforms, generally have a robotic control system that controls the operational systems of the device.

Sensor inputs to the robotic control system may include data associated with the platform's destination, preprogrammed path information, and detected obstacle information. Based on such data associated with the information above, the mobile robotic platform's movements are controlled. Obstacle detection systems within a platform may, for example, use a camera or cameras to capture images over the broad field of view, or of a particular spectrum within the field of view. For obstacle detection applications of a service robot, the response time for collecting image data should be rapid over a wide field of view to facilitate early recognition and avoidance of obstacles.

In addition, these mobile robotic platforms also include a locomotion system, a power system, a task payload system, such as a cutting system for lawn mowing, and a path planning system. Path planning may include point-to-point planning or area coverage planning. Area coverage may be random coverage of an area by the service robot over a predetermined period of time or may be precise area coverage with localization. Localization perception or location sensing devices for service robots may, for example, include compasses, odometers, global positioning system receivers, and vision-based triangulation systems. Further, these mobile robotic platforms also include perception for safeguarding to prevent damage to the service robot, itself, or other objects that may be present in the operating environment.

Current outdoor service robots, such as robotic lawn mowers, are configured to operate by detecting an electrical wire, which is usually pounded into the ground, to outline the boundary of the area where the robotic mower is to operate and perform its tasks and functions. However, illustrative embodiments eliminate the need for this boundary wire. Initially a user paints the boundary of an operating environment for the robotic mower with a substance, such as a liquid, a gel, or a powder, which has color for aiding the user in application of the substance, but the substance quickly fades away or disappears. A component included in the substance used to mark all or part of the operating environment boundary is longer lasting and may be used to direct functions of the robot, as well as provide an operating environment boundary.

The component may degrade or relocate over time due to factors, such as precipitation, wind, sunlight, vegetation or other worksite material removal, impact damage, and so on. Thus, a need exists to increase the level of the component at a time interval that is less than the component's expected useful life in its particular environment. This expected useful life sets a maximum predetermined time interval between visits of the mobile machine to the boundary to replenish the component material and is ideally longer than the visit interval for the mobile machine's normal tasks, such as mowing.

The component may, for example, be a pheromone, a non-visible pigment, a small fleck of visible material, such as a small piece of metal, or a radio frequency identification tag. The non-visible pigment is a pigment that reflects light at wavelengths and frequencies outside the visible portion of the electromagnetic spectrum. The robot is capable of adding a new coat of the substance when the strength of the component fades due to time and environmental conditions.

The pheromone, in addition to directing functions of the robot, may be used to attract beneficial creatures and repel undesirable creatures, such as rabbits, wild dogs and cats, deer, skunks, gophers, and moles. The radio frequency identification tags, in addition to directing functions of the robot, may be used for positioning and localization of the robot or other outdoor system. Small passive radio frequency identification tags or small flecks of metal or other identifiable material may be sprinkled over the entire area of the operating environment, which the user wants the robot to operate within.

The radio frequency identification tags or flecks are small enough to settle down through the grass to the soil below and may even be covered by the soil in time without any disruption of function. The tags may, for example, be 0.4 millimeters×0.4 millimeters in size, which is approximately the size of a grain of sand. The robot then detects these small-sized radio frequency identification tags as the robot rolls over them using a radio frequency identification reader. When the robot gets to an area where no radio frequency identification tags can be detected, the robot knows it is in an area where it should not be and returns to where the radio frequency identification tags are detected again. As a result, illustrative embodiments remove the need for the traditional buried wire for defining the robotic mowing boundary.

Further, illustrative embodiments may include additional intelligence to collect data, such as the density of radio frequency identification tags and/or the tag identification data in the operating environment to communicate behavior or function to the robot. For example, in areas of the operating environment that the user wants the mowing system to spend more time, the user may increase the density of the tags in those particular areas. The use of tag identification data may also be used to mark special areas.

For example, a specific tag identification code may be encoded in tags placed on the operating environment boundary to let the mowing system know when the robot is close to the boundary. In addition, another special tag identification code may be encoded in tags placed on the edge of a sidewalk, for example, to direct the robot to perform an edging function during the mowing task. Furthermore, precise localization is also possible using tag identification data so that the robot has a map of the tag identification data across the operating environment area. Based on the different densities of the tags within the operating environment, the user is able to control the precision of localization for the robot.

Also, a detour code, such as a current date or special serial number, may be encoded in new tags, which instructs to robot to follow the new tags instead of the old tags or just simply ignore the old tags, which is similar to electronic white out. Moreover, special sensors may be included in some or all of the radio frequency identification tags for determining the condition or health of the grass. For navigation, the mowing system may use a sensor fusion approach. In other words, because the radio frequency identification tags may be spaced at random intervals, the mowing system may utilize relative position estimates based on inertial, odometry, and possibly low cost GPS.

Figure 1:
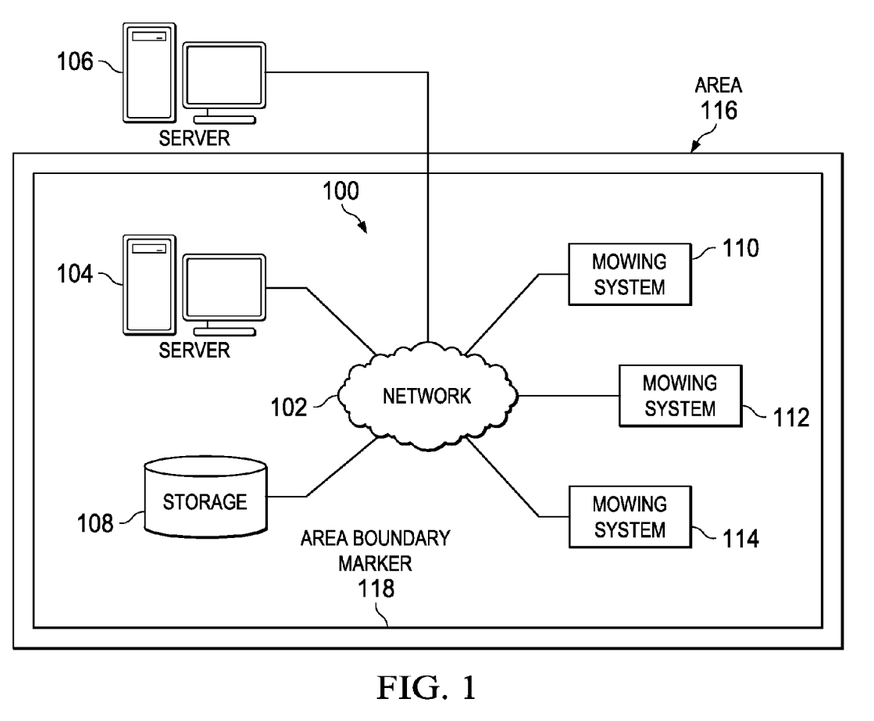
FIG. 1 is a pictorial representation of a network of data processing systems in which an illustrative embodiment may be implemented.
Figure 2:
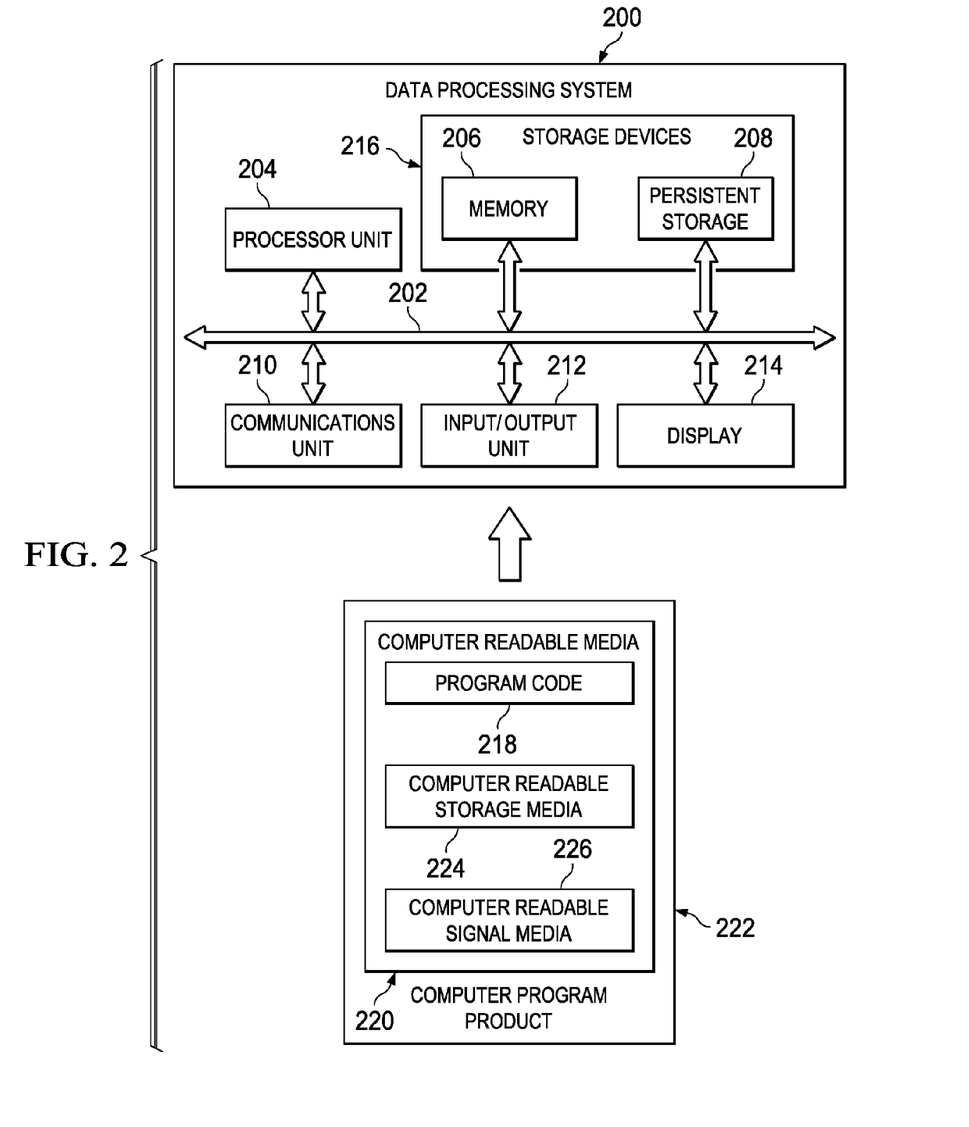
FIG. 2 is a block diagram of a data processing system in which an illustrative embodiment may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of data processing systems and other devices in which the illustrative embodiments may be implemented. Network data processing system 100 contains network 102, which is the medium used to provide communications links between the various data processing systems and other devices connected together within network data processing system 100. Network 102 may include connections, such as wire, wireless communication links, or fiber optic cables.

In the depicted example, server 104 and server 106 connect to network 102 along with storage unit 108. In addition, mowing system 110, mowing system 112, and mowing system 114 also connect to network 102. Mowing systems 110-114 are clients to server 104 and/or server 106 in this example.

In the depicted example, server 104 provides information, such as boot files, operating system images, and applications to mowing systems 110-114. Server 104 may, for example, be a local server, which may be located in a smart house. Server 106 may, for example, be a remote server, which may be located at a robotic mower manufacturing site or a product information site. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to mowing system 110 over network 102 for use on mowing system 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN).

Mowing systems 110-114 are autonomous data processing systems that include mobile service robot mowers for performing automatic mowing tasks and other functions, such as edging and reapplying emitters, in and around area 116. Mowing systems 110-114 each may include one or more mobile service robot mowers and their associated charging stations. In addition, even though this illustrative example illustrates three mowing systems, illustrative embodiments are not restricted to such. In other words, illustrative embodiments may include more or fewer mowing systems to provide robotic mowing services for area 116.

Area 116 may, for example, be one or more residential lots, commercial lots, golf courses, parks, fields, or any other area of residential, commercial, recreational, or amenity land planted with grass. Area 116 may, for example, include one or more structures, such as houses, commercial buildings, storage sheds, and recreational equipment, and one or more parking areas, driveways, and sidewalks. Area 116 may be contiguous or non-contiguous.

In one illustrative embodiment, the grass in area 116 may be maintained at a low, even height. In another illustrative embodiment, the grass in area 116 may be maintained at different even heights. In addition, the grass in area 116 may include any species of grass or turf. Furthermore, area 116 containing grass is only one example of a worksite. Other types of worksites and operations may include, but are not limited to, driveways and snow removal, lawns and leaf removal, carpets and vacuuming, hard surface floors and scrubbing, and sidewalks and ice removal.

Area boundary marker 118 marks the boundaries of the operating environment within area 116 for mowing systems 110-114. Mowing systems 110-114 use area boundary marker 118 to identify which portions of area 116 mowing systems 110-114 are to service. Area boundary marker 118 may, for example, be an emitter, such as, a pheromone, a non-visible pigment, a small fleck of visible material, or a radio frequency identification tag.

A user may initially place the emitter along the boundary of the operating environment designated to contain the mobile service robot mower. In addition, the user may randomly or uniformly disseminate or scatter the emitter over the entire area designated to contain the mobile service robot mower. Further, the user may place the emitter in defined patterns, such as along driveways, parking lots, and sidewalks, and around buildings, trees, and gardens, in area 116.

Furthermore, the emitter may be included in a boundary application substance. The boundary application substance may, for example, be a liquid, such as a paint, a gel, or a powder. In addition, the boundary application substance may include a color for increased visibility for initial application of area boundary marker 118 by a user. Moreover, the color of the boundary application substance may fade or gradually disappear after a period of time, such as, for example, 1-3 hours, 1-3 days, 1-3 weeks, or 1-3 months.

The pheromone emitter consists of a blend of two or more chemicals, which need to be in the right proportion to be active. The pheromone emitter may be a natural pheromone, a synthetic pheromone, or a combination of natural and synthetic pheromones. The pheromone emitter produces a scent that mowing systems 110-114 are capable of detecting via a sensor system. A user may utilize the pheromone emitter to attract beneficial creatures, such as worms and ladybugs, and repel undesirable creatures, such as fire ants and moles, in addition to marking operating environment boundaries for the mobile service robot mower in and around area 116.

The non-visible light emitter may be a substance, such as, for example, aluminum, which reflects ultraviolet light. Mowing systems 110-114 are capable of detecting the reflected non-visible light via a sensor system. The user utilizes the non-visible light emitter to mark operating environment boundaries for the mobile service robot mower in and around area 116. The small fleck of visible material emitter may, for example, be a plurality of small pieces of metal. The mobile service robot mower may detect the small fleck of visible material emitter by, for example, using a radio detection and ranging system or other suitable detection system.

The radio frequency identification (RFID) tag emitter is a plurality of passive radio frequency identification tags, which the user utilizes to mark operating environment boundaries for the mobile service robot mower in and around area 116. The passive radio frequency identification tags do not have an internal power source and, thus, require an external source to provide signal transmission power. The passive radio frequency identification tags are small transponders, which respond to queries from a radio frequency identification reader via wireless transmission. The radio frequency identification reader provides the external power source for the tags is located in, for example, the sensor system of the mobile service robot mower. However, it should be noted that alternative illustrative embodiments may use optical radio frequency identification (OPID). Optical radio frequency identification utilizes an optical reader instead of radio frequency reader to collect data from the tags.

The user may utilize a plurality of different densities of the radio frequency identification tags throughout the area designated to contain the mobile service robot mower. A specific density of radio frequency identification tags within the plurality of different densities of radio frequency identification tags may specify a specific function for the mobile service robot mower, such as instructing the robot to perform an act of edging. Alternatively, different functions for the mobile service robot mower may be encoded within different radio frequency identification tags. In addition, the user may disseminate new radio frequency identification tags that include new encoded information, such as a current date or new serial number, which instructs the mobile service robot mower to ignore the old tags and use the new tags. Also, a sensor may be placed in all or a portion of the plurality of radio frequency identification tags to monitor the condition of the grass.

The size of the radio frequency identification tags may, for example, be 0.4 millimeters×0.4 millimeters. However, the size of the tags may range from between 0.1 millimeter×0.1 millimeter to 0.05 millimeters×0.05 millimeters. Other embodiments may utilize tags of any size.

Even though area boundary marker 118 is shown as a single marker in this exemplary illustration, area boundary marker 118 may include a plurality of markers. In addition, even though area boundary marker 118 is shown as having a square configuration, a user may form area boundary marker 118 in any shape or configuration necessary.

FIG. 1 is only intended as an example, and not as an architectural limitation for the different illustrative embodiments.

With reference now to FIG. 2, a block diagram of a data processing system is depicted in which an illustrative embodiment may be implemented. Data processing system 200 is an example of a data processing system, such as server 104 or mowing system 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may, for example, be a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
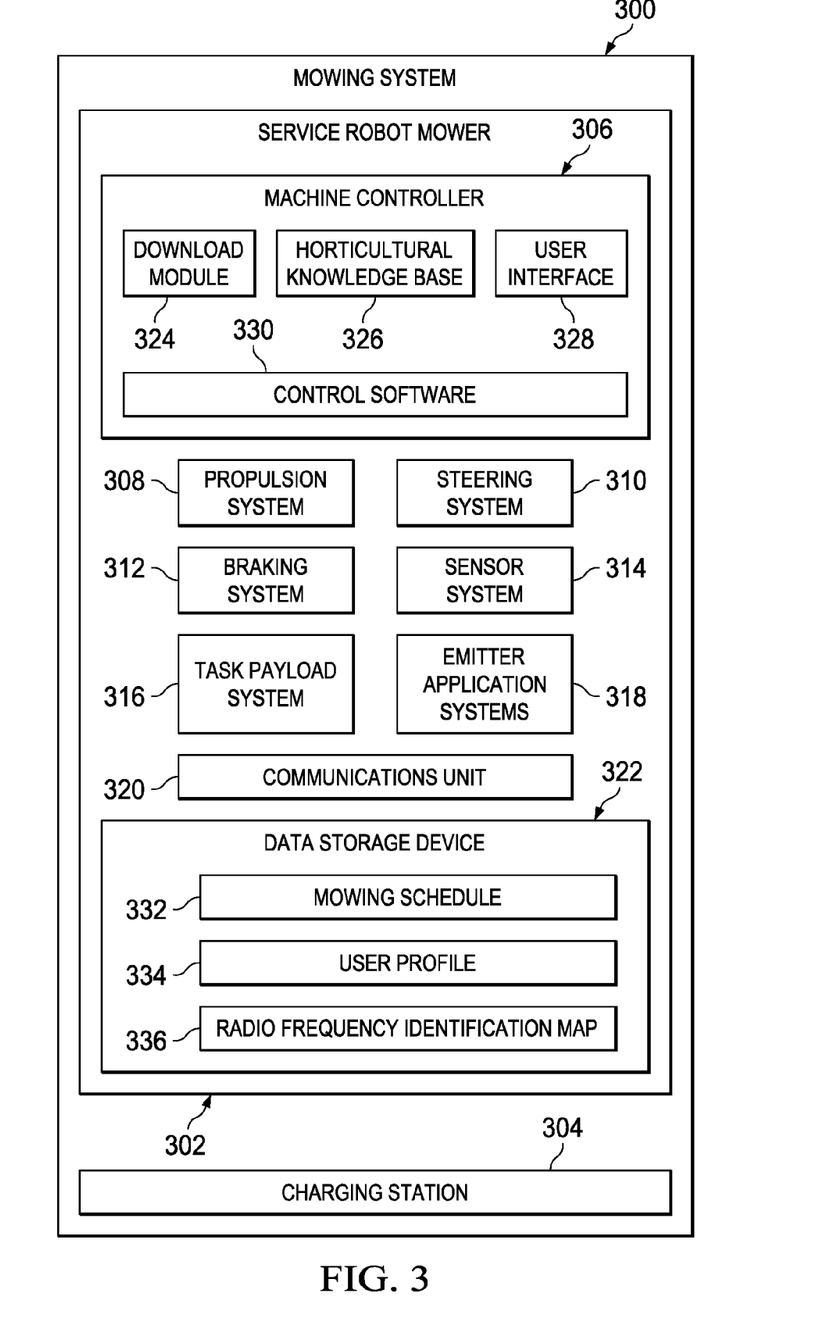
FIG. 3 is a block diagram of a mowing system in accordance with an illustrative embodiment.

With reference now to FIG. 3, a block diagram of a mowing system is depicted in accordance with an illustrative embodiment. Mowing system 300 may, for example, be mowing system 110, mowing system 112, or mowing system 114 in FIG. 1. However, it should be noted that mowing system 300 is only intended as an example of one possible implementation of a mowing system.

As illustrated, mowing system 300 includes service robot mower 302 and charging station 304. However, it should be noted that mowing system 300 may include a plurality of service robot mowers and charging stations. Service robot mower 302 is a mobile service robot that is configured to automatically and autonomously mow a designated area, such as area 116 in FIG. 1. The designated area may, for example, be a lawn, field, golf course, and/or other similar type of grassy area. Also, the designated area is defined by one or more emitters or boundary markers, such as area boundary marker 118 in FIG. 1. The one or more emitters identify the boundaries of the area to be mowed by service robot mower 302 and may be pheromones, non-visible pigments, small flecks of metallic material, and/or radio frequency identification tags.

Charging station 304 is a base or docking station for service robot mower 302. Service robot mower 302 uses charging station 304 to recharge its power source. The power source for service robot mower 302 may, for example, be one or more rechargeable batteries. However, it should be noted that service robot mower 302 may utilize any type of rechargeable or refuelable power source for powering its various components and systems. Service robot mower 302 docks with charging station 304 when service robot mower 302 completes a scheduled mowing task. In addition, service robot mower 302 may dock with charging station 304 to recharge or refuel its power source as needed while performing a mowing task.

Service robot mower 302 includes machine controller 306, propulsion system 308, steering system 310, braking system 312, sensor system 314, task payload system 316, emitter application system 318, communications unit 320, and data storage device 322. Machine controller 306 includes download module 324, horticultural knowledge base 326, user interface 328, and control software 330. Machine controller 306 may, for example, be a data processing system, such as data processing system 200 in FIG. 2, or some other device that may execute instructions or processes to control functions of service robot mower 302. Thus, machine controller 302 may be a computer, an application integrated specific circuit, and/or some other suitable device. In addition, different types of devices and systems may be used to provide redundancy and fault tolerance.

Machine controller 306 may execute processes using control software 330 to control propulsion system 308, steering system 310, braking system 312, and sensor system 314, which direct movement of service robot mower 302 in the operating environment. Also, machine controller 306 may execute processes using control software 330 to control task payload system 316, which performs tasks, such as, for example, evenly cutting the grass growing within the operating environment designated by the boundary emitter. Furthermore, machine controller 306 may execute processes using control software 330 to control emitter application system 318, which maintains the strength of the emitter in and around the operating environment of service robot mower 302 by reapplying the emitter over the previously disseminated emitter on a predetermined time interval basis and/or on an as needed basis.

Machine controller 306 may send various commands to systems 308-318 to operate service mower robot 302 in different modes of operation. These commands may take various forms depending on the implementation. For example, the commands may be analog electrical signals in which a voltage and/or current change is used to control these systems. In other implementations, the commands may take the form of data sent to the systems to initiate the desired functions or actions.

Download module 324 may provide online updates for horticultural knowledge base 326 from a remote network server, such as server 106 in FIG. 1. However, the updates may be provided by a local network server, such as server 104 in FIG. 1. In addition, download module 324 may also provide for online updates of programming and/or data for any of the systems and components of mowing system 300.

Horticultural knowledge base 326 contains information about the operating environment, such as, for example, a geo-referenced map showing the landscape, structures, tree locations, flowerbed locations, individual plant locations, driveway locations, sidewalk locations, and other static object locations, such as parking lots, pools, ponds, and recreational equipment. In addition, horticultural knowledge base 326 may also contain information, such as, without limitation, grass species located in the operating environment; information about water requirements, growth stages, and life cycles of the grass species located in the operating environment; current weather for the operating environment; weather history for the operating environment; specific environmental features of the operating environment that affect service robot mower 302; and the like. It should be noted that horticultural knowledge base 326 may be located entirely in service robot mower 302 or parts or all of horticultural knowledge base 326 may be located in a remote location, such as storage 108 in FIG. 1, which service robot mower 302 may access via communications unit 320.

User interface 328 may, in one illustrative embodiment, be implemented in a display device, which is mounted on service robot mower 302 and viewable by a user. User interface 328 may, for example, display sensor data obtained from sensor system 314 regarding the operating environment surrounding service robot mower 302, as well as messages, alerts, and queries for the user. In other illustrative embodiments, user interface 328 may be implemented in a remote display device held by the user or may be implemented in a remote data processing system, such as server 104 in FIG. 1, which may be located in a smart house.

In these examples, propulsion system 308 propels or moves service robot mower 302 in response to commands from machine controller 306. Propulsion system 308 may maintain or increase the speed at which service robot mower 302 moves in response to instructions received from machine controller 306. Propulsion system 308 may be an electrically controlled propulsion system. In addition, propulsion system 308 may, for example, be an internal combustion engine, an internal combustion engine/electric hybrid system, an electric engine, or some other suitable propulsion system.

Steering system 310 controls the direction or steering of service robot mower 302 in response to commands received from machine controller 306. Steering system 310 may, for example, be an electrically controlled hydraulic steering system, an electrically driven rack and pinion steering system, an Ackerman steering system, a skid-steer steering system, a differential steering system, or some other suitable steering system.

Braking system 312 slows down and/or stops service robot mower 302 in response to commands from machine controller 306. Braking system 312 may be an electrically controlled braking system. In addition, braking system 312 may, for example, be a hydraulic braking system, a friction braking system, or some other suitable braking system that may be electrically controlled.

Sensor system 314 is a high integrity perception system and may be a set of sensors used to collect information about the operating environment around service robot mower 302. In these examples, sensor system 314 sends the collected information to machine controller 306 to provide data for identifying how service robot mower 302 should operate within the environment. For example, sensor system 314 may send data to machine controller 306 regarding boundaries of the operating environment for service robot mower 302. Sensor system 314 may determine the boundaries of the operating environment by using a boundary sensor that may, for example, include a radio frequency identification reader, a non-visible pigment sensor, a pheromone sensor, and/or a radio detection and ranging system. In these examples, a set refers to one or more items. Thus, a set of sensors is one or more sensors in these examples.

Communication unit 320 is a high integrity communications system and may provide multiple redundant communications links and channels to machine controller 306 in order for machine controller 306 to receive information. The communication links and channels may be heterogeneous and/or homogeneous redundant components that provide fail-safe communication. This received information may, for example, include data, commands, and/or instructions.

Communication unit 320 may take various forms. For example, communication unit 320 may include a wireless communications system, such as a cellular phone system, a wireless fidelity (Wi-Fi) technology system, a Bluetooth wireless technology system, and/or some other suitable wireless communications system. Further, communication unit 320 also may include a communications port, such as, for example, a universal serial bus port, a serial interface, a parallel port interface, a network interface, and/or some other suitable port to provide a physical communications link. Communication unit 320 may be used to communicate with a user or a remote data processing system, such as a server or other network device.

Data storage device 322 is one example of persistent storage 208 in FIG. 2. Data storage device 322 includes mowing schedule 332, user profile 334, and radio frequency identification map 336. However, it should be noted that one or more of mowing schedule 332, user profile 334, and radio frequency identification map 336 may be stored on a network server or a network storage device instead of or in addition to on data storage device 322.

Machine controller 306 uses mowing schedule 332 to determine when to send a command to service robot mower 302 to perform a mowing task. Mowing schedule 332 may be a default mowing schedule entered by the manufacturer, a mowing schedule entered by the user via user interface 328, or a modified mowing schedule generated by machine controller 306.

User profile 334 is a file that may store information regarding the user and the user's preferences. User profile 334 may contain data, such as, for example, user name, user security password, time preferences for when to perform mowing tasks, and time preferences for when not to perform mowing tasks. Radio frequency identification map 336 is a map of the radio frequency identification tags in the operating environment for service robot mower 302. In addition, radio frequency identification map 336 may include a map of the encoded data contained on the radio frequency identification tags in the operating environment. Machine controller 306 may, for example, use radio frequency identification map 336 for navigation and interaction, such as task and function control, within the operating environment.

The exemplary illustration of mowing system 300 in FIG. 3 is not meant to imply physical or architectural limitations on the manner in which different advantageous embodiments may be implemented. Other components in addition to or in place of the ones illustrated may be used. Some components may be unnecessary in some advantageous embodiments. Also, the blocks are presented to illustrate some functional components and combined and/or divided into different blocks when implemented in hardware and/or software. For example, in some advantageous embodiments horticultural knowledge base 326 may be separate and distinct from mowing system 300, but capable of being used by mowing system 300.

Figure 4:
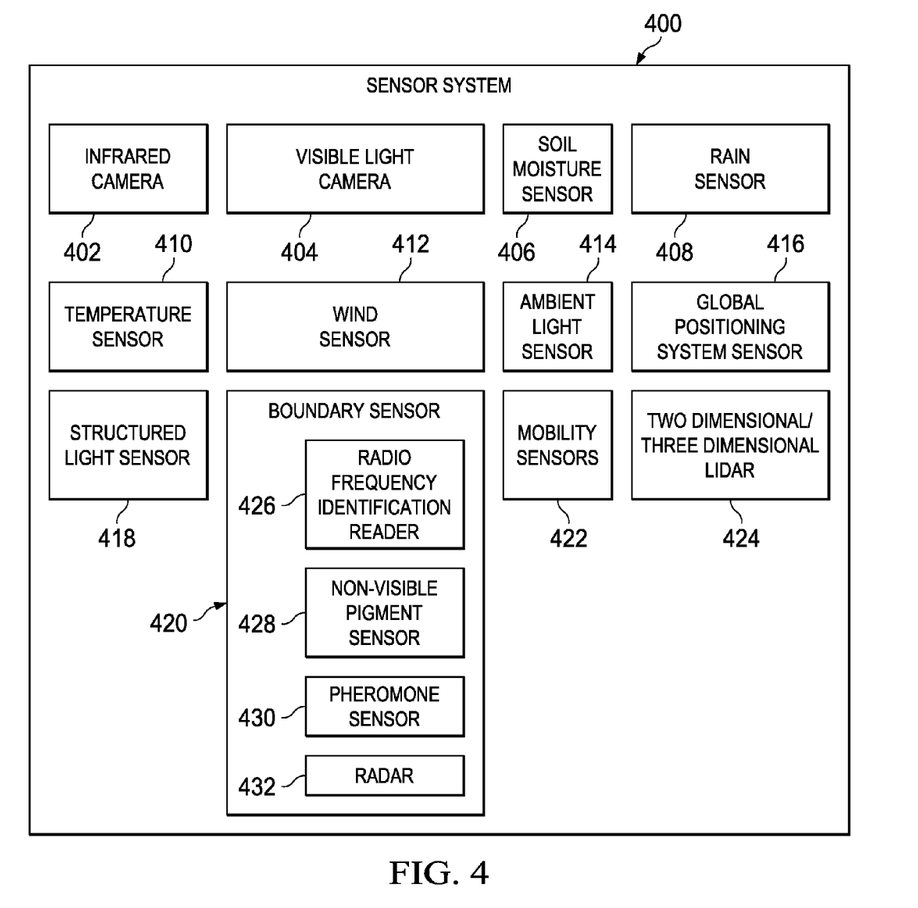
FIG. 4 is a block diagram of a sensor system in accordance with an illustrative embodiment.

With reference now to FIG. 4, a block diagram of a sensor system is depicted in accordance with an illustrative embodiment. Sensor system 400 is an example of one implementation of sensor system 314 in FIG. 3.

As illustrated, sensor system 400 includes infrared camera 402, visible light camera 404, soil moisture sensor 406, rain sensor 408, temperature sensor 410, wind sensor 412, ambient light sensor 414, global positioning system (GPS) sensor 416, structured light sensor 418, boundary sensor 420, mobility sensors 422, and two dimensional/three dimensional light detection and ranging (LIDAR) 424. A machine controller, such as machine controller 306 in FIG. 3, may use one or more of these different sensors to identify the operating environment around a mobile machine, such as service robot mower 302 in FIG. 3. The machine controller may select from these different sensors in sensor system 400 such that at least one of these sensors is always capable of sensing information needed to operate the mobile machine in different operating environments.

Infrared camera 402 may form an image using infrared radiation. Thus, infrared camera 402 may detect heat indicative of a living thing versus an inanimate object in the operating environment of the mobile machine. Visible light camera 404 may be a standard still-image camera, which may be used alone for color information or with a second camera to generate stereoscopic, or three-dimensional, images. When visible light camera 404 is used along with a second camera to generate stereoscopic images, the two or more cameras may be set with different exposure settings to provide improved performance over a range of lighting conditions.

Visible light camera 404 may also be a video camera that captures and records images. As a result, visible light camera 404 may be a component in a video-based object recognition system. The video-based object recognition system uses shape recognition to trigger alerts when a target is matched.

One capability provided by video system monitoring of an area, such as area 116 in FIG. 1, is large obstacle detection, which may delay a scheduled mowing task or may adjust the zone to be mowed when new dynamic objects, such as children or pets, enter the area. Further, the video-based object recognition system may be used to verify that the service robot mower is operating in the correct section of the yard when scheduled. Furthermore, infrared images provided by infrared camera 402 and images provided by visible light camera 404 may be processed using means known in the art to identify grass species and assess grass health.

Soil moisture sensor 406 detects the current in situ soil moisture from specific portions of the operating environment. Sensor system 400 may transmit this in situ soil moisture data back to a server, such as server 104 in FIG. 1, which may be located in a smart house to assist the server in determining when an irrigation system is to water the grass in the operating environment. Rain sensor 408 detects precipitation on an exterior surface of the service robot mower. Temperature sensor 410 detects the ambient temperature of the operating environment. Wind sensor 412 detects the wind speed in the operating environment. Ambient light sensor 414 measures the amount of ambient light in the operating environment.

In one illustrative embodiment, one or more of sensors 408-414 may be located on a charging station, such as charging station 304 in FIG. 3, instead of on the service robot mower. In addition, one or more of these sensors, such as temperature sensor 410 and wind sensor 412, may be optional features of sensor system 400. Also, a communications unit, such as communications unit 320 in FIG. 3, may transmit data obtained by one or more of these sensors to an online database, such as storage 108 in FIG. 1.

The mobile service robot mower may use GPS sensor 416 to identify the location of the mobile service robot mower with respect to other objects in the operating environment. GPS sensor 416 may be any type of radio frequency triangulation scheme based on signal strength and/or time of flight. Examples include, without limitation, the Global Positioning System, Glonass, Galileo, and cell phone tower relative signal strength. Position is typically reported as latitude and longitude with an error that depends on factors, such as condition of the ionosphere, satellite constellation, and signal attenuation from vegetation.

Structured light sensor 418 emits light in a pattern, such as one or more lines, reads back the reflections of the light pattern through a camera, and interprets the reflections to detect and measure objects in an operating environment. For example, structured light sensor 418 may measure the grass spatial density within the operating environment, which the mobile service robot mower may use to determine grass quantity. In addition, the mobile service robot mower may use structured light sensor 418 to detect obstacles or objects in the operating environment.

Boundary sensor 420 detects a boundary marker, such as area boundary marker 118 in FIG. 1. The boundary marker may, for example, be an emitter, such as a pheromone, non-visible pigment, small metal fleck, or radio frequency identification tag, which identifies the boundary of the operating environment for the mobile service robot mower. The mobile service robot mower uses boundary sensor 420 to alert a machine controller, such as machine controller 306 in FIG. 3, that the service robot mower is exiting or is about to exit the designed operating environment. Further, in response to detecting the emitter, boundary sensor 420 may alert the machine controller to direct the service robot mower to perform a specific function, such as change course of movement away from the emitter, initiate an action, stop an action, and perform an act, during performance of the mowing task. The act may, for example, be edging the grass along a concrete area or around a tree.

Boundary sensor 420 includes radio frequency identification reader 426, non-visible pigment sensor 428 pheromone sensor 430, and radio detection and ranging (RADAR) 432. However, it should be noted that illustrative embodiments are not limited to such. In other words, boundary sensor 420 may only include one sensor or reader or may include different combinations of sensors and readers other than what is illustrated. Radio frequency identification reader 426 wirelessly retrieves data from radio frequency identification tags, which are disseminated in the operating environment. The machine controller may correlate the data retrieved from the radio frequency identification tags to a radio frequency identification map, such as radio frequency identification map 336 in FIG. 3, for navigation and interaction control.

Non-visible pigment sensor 428 detects a non-visible pigment emitter. The non-visible pigment emitter may, for example, reflect ultraviolet light, which non-visible pigment sensor 428 is capable of detecting. Pheromone sensor 430 detects a pheromone emitter. The pheromone emitter produces a scent that pheromone sensor 430 is capable of detecting.

Radio detection and ranging 432 is an object detection system that uses electromagnetic waves to identify the range, altitude, direction, or speed of both moving and fixed objects. Radio detection and ranging 432 may be used in a time of flight mode to calculate distance to an object, as well as Doppler mode to calculate the speed of an object. Radio detection and ranging 432 is capable of detecting small metal fleck emitters, which may be positioned along boundaries of the operating environment, around objects within the operating environment, and/or scattered over the entire operating environment in different densities to communicate behavior or function to the mobile service robot mower.

The mobile service robot mower may use mobility sensors 422 to safely and efficiently guide the mobile service robot mower through the designated operating environment. Mobility sensors 422 may, for example, include an odometer, a compass for dead reckoning, vision and ultrasonic sensors for obstacle/object detection, and/or any other suitable sensor.

Two dimensional/three dimensional light detection and ranging 424 emits laser pulses as a beam, than scans the beam to generate two dimensional or three dimensional range matrices. The machine controller uses the range matrices to determine distance to an object or surface by measuring the time delay between transmission of a pulse and detection of the reflected signal.

Sensor system 400 may retrieve data from one or more of the sensors to obtain different perspectives of the operating environment. For example, sensor system 400 may obtain visual data from visible light camera 404, data about the distance of the service robot mower in relation to objects in the operating environment from two dimensional/three dimensional light detection and ranging 424, and location data of the service robot mower in relation to a map from GPS sensor 416.

Sensor system 400 is capable of detecting objects even in different operating environments. For example, GPS sensor 416 may be used to identify a position of the vehicle. If the operating environment includes trees with thick canopies during the spring, GPS sensor 416 may be unable to provide accurate location information. In some cases, conditions may cause the location information provided by GPS sensor 416 to be less accurate than desired. For example, in a condition with a heavy canopy, the signal from a satellite to a global positioning system receiver may be attenuated and more prone to multipath. Multipath results when a signal between a GPS satellite and a GPS receiver follows multiple paths, typically caused by reflection from objects in the environment. These multiple signals may interfere with one another and the result may be phase shifting or destructive interference of the combined received signal. The signal corruption may result in a significant reduction in GPS position accuracy. In this situation, visible light camera 404 and/or two dimensional/three dimensional light detection and ranging 424 may be used to identify a location of the service robot mower relative to non-mobile objects, such as structures, trees, recreational equipment, and other suitable landmarks.

Sensor system 400 is a set of sensors that collect data and information about the operating environment around the mobile service robot mower, as well as the condition of the grass in the area to be mowed. In these examples, a set refers to one or more items. Thus, a set of sensors refers to one or more sensors in these examples.

Figure 5:
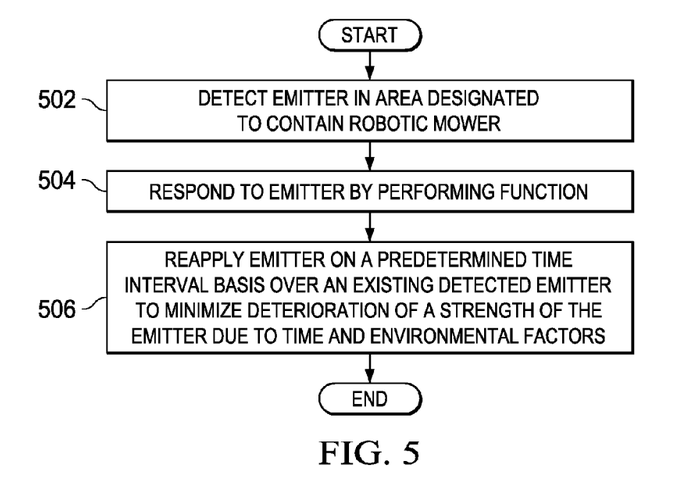
FIG. 5 is a flowchart illustrating an exemplary process for reapplying an emitter based on a time interval in accordance with an illustrative embodiment.

With reference now to FIG. 5, a flowchart illustrating an exemplary process for reapplying an emitter based on a time interval is shown in accordance with an illustrative embodiment. The process shown in FIG. 5 may be implemented in a mowing system, such as mowing system 300 in FIG. 3.

The process begins when the mowing system uses a sensor system, such as sensor system 314 in FIG. 3 or sensor system 400 in FIG. 4, to detect an emitter in an area designated to contain a robotic mower, such as service robot mower 302 in FIG. 3 (step 502). Then, the mowing system uses a machine controller, such as machine controller 306 in FIG. 3, to respond to the emitter by performing a function (step 504). The function may be changing a course of movement away from the emitter, initiating an action, stopping an action, and performing an act. In addition, the mowing system utilizes an emitter application system, such as emitter application system 318 in FIG. 3, to reapply the emitter on a predetermined time interval basis over an existing detected emitter to minimize deterioration of a strength of the emitter due to time and environmental factors (step 506). The process terminates thereafter.

Figure 6:
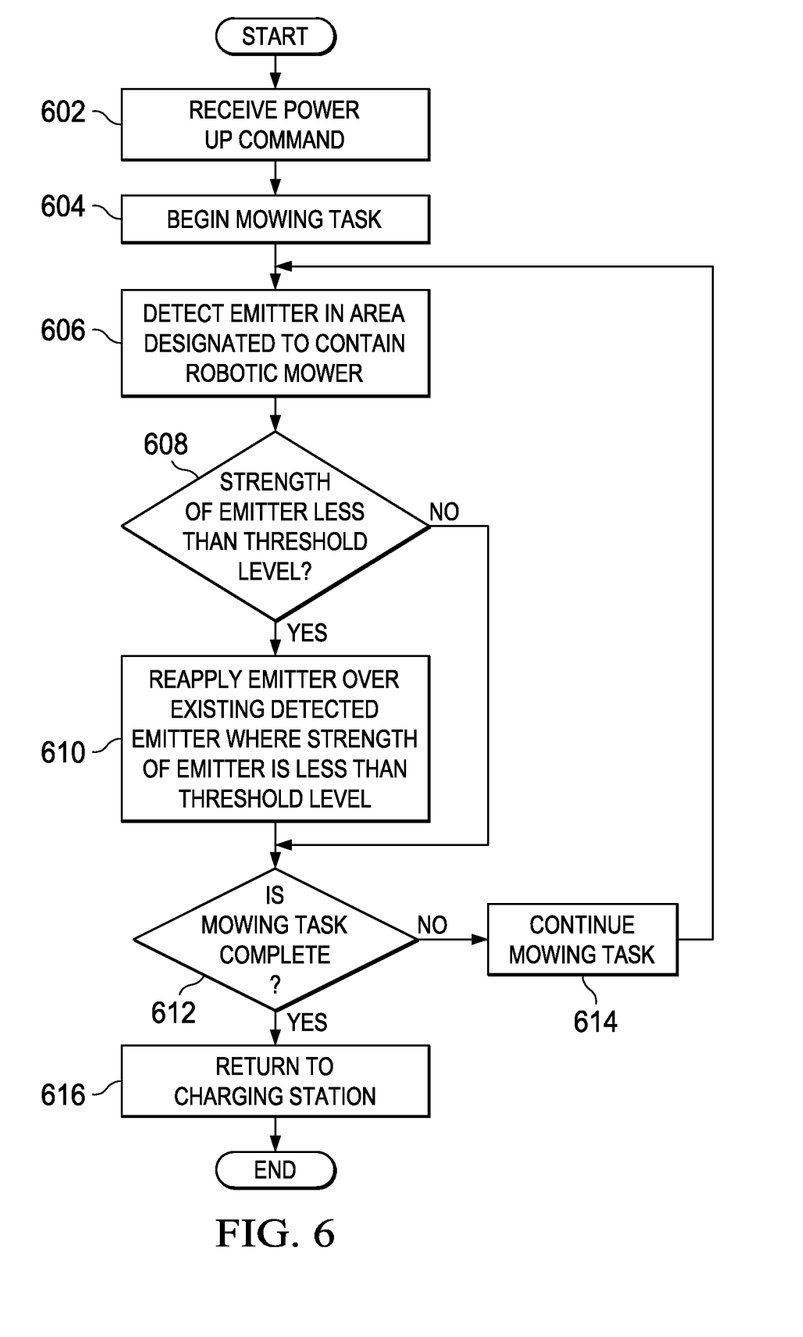
FIG. 6 is a flowchart illustrating an exemplary process for reapplying an emitter based on a strength of the emitter in accordance with an illustrative embodiment.

With reference now to FIG. 6, a flowchart illustrating an exemplary process for reapplying an emitter based on a strength of the emitter is shown in accordance with an illustrative embodiment. The process shown in FIG. 6 may be implemented in a mowing system, such as mowing system 300 in FIG. 3.

The process begins when the mowing system receives a power up command (step 602). The command to power up may be based on a mowing schedule, such as mowing schedule 332 in FIG. 3. Then, the mowing system uses a service robot mower, such as service robot mower 302 in FIG. 3, to begin a mowing task (step 604). Subsequently, the service robot mower uses a sensor system, such as sensor system 314 in FIG. 3 or sensor system 400 in FIG. 4, to detect an emitter in an area designated to contain the robotic mower (step 606).

Then, the service robot mower uses a machine controller, such as machine controller 306 in FIG. 3, to determine whether a strength of the detected emitter is less than a threshold level for the emitter (step 608). If the strength of the detected emitter is not less than the threshold level, no output of step 608, then the process proceeds to step 612. If the strength of the detected emitter is less than the threshold level, yes output of step 608, then the service robot mower uses an emitter application system, such as emitter application system 318 in FIG. 3, to reapply the emitter over the existing detected emitter where the strength of the emitter is less than the threshold level (step 610).

Afterward, the machine controller makes a determination as to whether the mowing task is complete (step 612). The machine controller may determine that the mowing task is complete or that the operating environment area is covered by, for example, expiration of a default or learned mowing time limit or by precise area localization provided by dead reckoning, GPS, and/or visual triangulation. If the mowing task is not complete, no output of step 612, then the machine controller directs the service robot mower to continue the mowing task (step 614). If the mowing task is complete, yes output of step 612, then the machine controller directs the service robot mower to return to a charging station, such as charging station 304 in FIG. 3 (step 616). The process terminates thereafter.

Thus, illustrative embodiments provide a method and system for maintaining emitter boundaries in and around an operating environment for a mobile service robot. The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for a mobile machine, the method comprising:
the mobile machine detecting an emitter in an area, the emitter defining an operating environment;
the mobile machine performing a function in the operating environment; and
the mobile machine applying additional emitter over the detected emitter to minimize deterioration of a strength of the emitter due to time and environmental factors, wherein the emitter is included in a boundary application substance, wherein the boundary application substance is initially applied by a user to form the boundary, and wherein the boundary application substance evaporates more rapidly than the emitter evaporates.

2. The method of claim 1, further comprising:
wherein detecting the emitter comprises determining whether the strength of the emitter is less than a threshold level during the function being performed; and
wherein applying the additional emitter is responsive to determining that the strength of the emitter is less than the threshold level, the additional emitter applied where the strength of the emitter is detected to be less than the threshold level.

3. The method of claim 1, wherein the function is at least one of changing a course of movement away from the emitter, initiating an action, stopping an action, and performing an act.

4. The method of claim 1, wherein the emitter is one of a pheromone, a radio frequency identification tag, a fleck of visible material, or a non-visible pigment.

5. The method of claim 4, wherein the radio frequency identification tag is one of a plurality of radio frequency identification tags, and wherein a portion of the plurality of radio frequency identification tags includes a sensor to monitor a condition of grass.

6. The method of claim 5, wherein a size of the plurality of radio frequency identification tags is between 0.1 millimeters×0.1 millimeters and 0.05 millimeters×0.05 millimeters.

7. The method of claim 5, wherein different functions are encoded within different radio frequency identification tags within the plurality of radio frequency identification tags.

8. The method of claim 4, wherein the pheromone is used to attract beneficial creatures and repel undesirable creatures.

9. The method of claim 1, wherein the emitter is placed along a boundary of the operating environment.

10. The method of claim 1, wherein the emitter is disseminated over an entire area designated to contain the mobile machine.

11. The method of claim 1, wherein the boundary application substance includes a color, and wherein the boundary application substance is one of a gel, a liquid, or a powder.

12. The method of claim 11, wherein the color of the boundary application substance disappears after a period of time.

13. The method of claim 1, wherein a plurality of different densities of radio frequency identification tags are disseminated in the area designated to contain the mobile machine.

14. The method of claim 13, wherein a specific density within the plurality of different densities of radio frequency identification tags specifies a specific function for the mobile machine.

15. The method of claim 1, wherein the mobile machine is a robotic mower, and the function performed by the robotic mower is mowing grass within the operating environment.

16. The method of claim 1, wherein the emitter is applied on a predetermined time interval basis.

17. The method of claim 16, wherein the time interval is less than an expected useful life of the emitter.

18. The method of claim 1, wherein the operating environment is an enclosed boundary that the mobile machine does not cross while performing the function.

19. The method of claim 1, further comprising:
responsive to applying the additional emitter, the mobile machine resuming performance of the function.

20. A mobile machine comprising:
a task payload system;
a propulsion system;
a steering system;
a braking system;

a sensor system for collecting data regarding an operating environment for the mobile machine;

an emitter application system for maintaining a strength of an emitter; and a machine controller coupled to the task payload system, the propulsion system, the steering system, the braking system, the sensor system, and the emitter application system; wherein the machine controller detects the emitter in an area, the emitter defining the operating environment, directs the mobile machine to perform a function in the operating environment; and applies additional emitter over the detected emitter using the emitter application system to minimize deterioration of a strength of the emitter due to time and environmental factors, wherein the emitter is included in a boundary application substance, wherein the boundary application substance is initially applied by a user to form the boundary, and wherein the boundary application substance evaporates more rapidly than the emitter evaporates.

21. The mobile machine of claim 20, wherein detecting the emitter comprises determining whether the strength of the emitter is less than a threshold level during the function being performed; and wherein the machine controller applies the additional emitter over the detected emitter using the emitter application system where the strength of the emitter is detected to be less than the threshold level in response to determining that the strength of the emitter is less than the threshold level.

22. The mobile machine of claim 20, wherein the function is at least one of changing a course of movement away from the emitter, initiating an action, stopping an action, and performing an act.

23. The mobile machine of claim 20, wherein the emitter is one of a pheromone, a radio frequency identification tag, a fleck of visible material, or a non-visible pigment.

24. The mobile machine of claim 20, wherein the function is mowing grass within the area designated to contain the mobile machine.

* * * * *